Jan. 2, 1923.
W. O. EDDY.
DEHYDRATOR.
FILED DEC. 19, 1921.
1,440,775
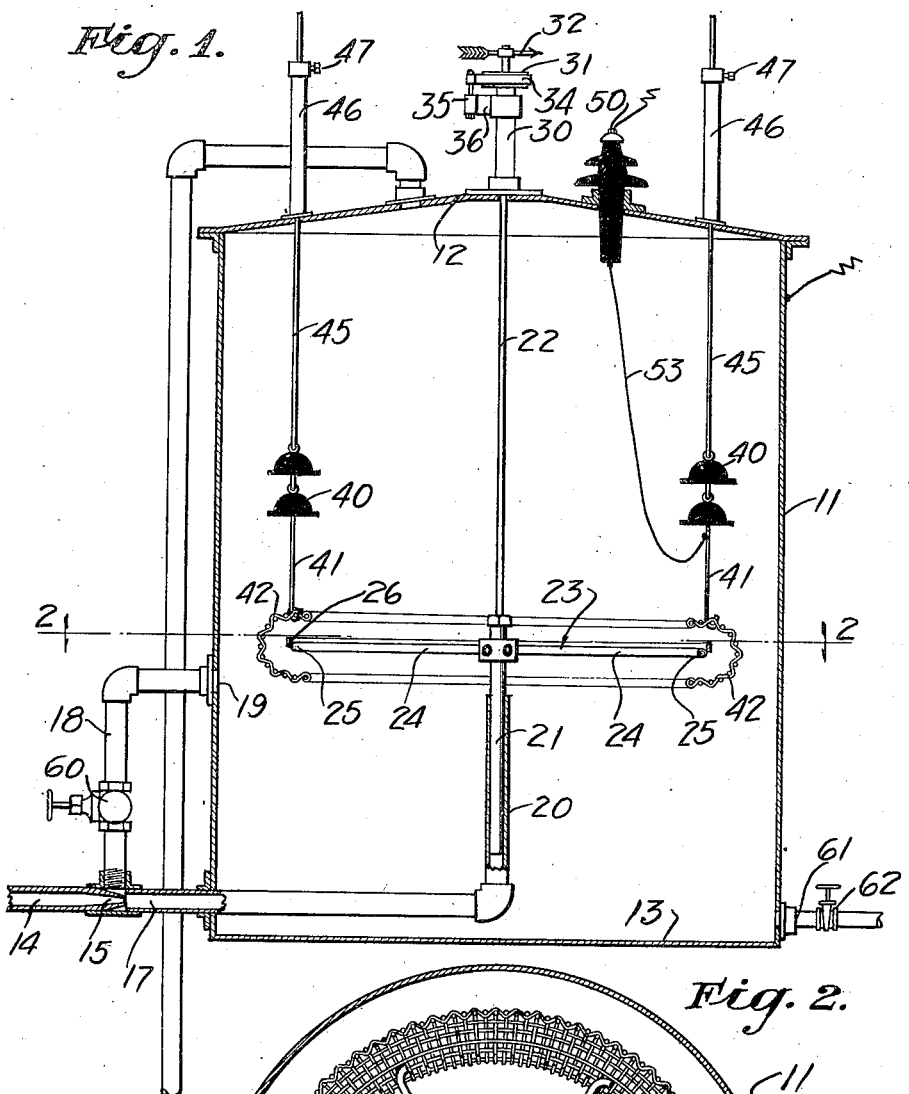

Patented Jan. 2, 1923.

1,440,775

UNITED STATES PATENT OFFICE.

WILLIAM O. EDDY, OF LOS ANGELES, CALIFORNIA, ASSIGNOR TO PETROLEUM RECTIFYING COMPANY OF CALIFORNIA, OF SAN FRANCISCO, CALIFORNIA, A CORPORATION OF CALIFORNIA.

DEHYDRATOR.

Application filed December 19, 1921. Serial No. 523,369.

*To all whom it may concern:*

Be it known that I, WILLIAM O. EDDY, a citizen of the United States, residing at Los Angeles, in the county of Los Angeles and State of California, have invented a new and useful Improvement in Dehydrators, of which the following is a specification.

My invention relates to dehydrators for petroleum emulsions which operate by means of an electrostatic field. It is a well known fact that when a body of petroleum emulsion is passed between electrodes which have an electromotive force impressed therebetween that the fine water particles carried in suspension in the emulsion agglomerate into large water masses which may be readily separated from the water by gravitational or other well known methods.

It is also a well known fact that some types of emulsions are quite rebellious to treatment, this being probably due to the presence of an undue proportion of very fine water particles. I have found that by mixing in coarse particles with the fine particles that I am able to promote dehydration. These coarse particles are automatically produced by any dehydrator which is working properly and it is an object of my invention to utilize the coarse particles produced in the dehydrator for the dilution of the fine emulsion with the object of rendering this fine emulsion more easily treated.

It is also common practice in the commercial types of electric dehydrators to provide a moving electrode which is operated through an electric motor and a more or less complicated system of gearing. It is a further object of my invention to provide a dehydrator having a moving electrode in which the electrode is rotated wholly by the force of the oil passing through the dehydrator.

Where emulsion is treated in large tanks, there is a marked settling action, the water and coarse water particles gathering in the bottom of the tank and the cleaned oil tending to rise to the top. There is, therefore, in any tank being subjected to treatment a gradual increase of the water content from the top of the tank to the bottom. It is a further object of my invention to provide means where the electric field can be readily moved vertically in the tank to place it in the zone having the proper degree of moisture to insure efficient operation.

A still further object of my invention is to provide a novel form of electrode for use in such a dehydrator.

A still further object of my invention is to provide means for regulating the speed of rotation of the movable electrode.

Referring to the drawing which is for illustrative purposes only,

Fig. 1 is a vertical cross section through a preferred embodiment of my invention.

Fig. 2 is a section on a plane represented by the line 2—2 of Fig. 1, the piping being omitted for the sake of clearness.

Fig. 3 is a plan view of the friction brake.

In the form of the invention shown, 11 is a tank having a tight top 12 and a tight bottom 13. Emulsion is supplied to the tank through a pipe 14 having an injector nozzle 15 projecting into a pipe 17, the space outside the nozzle 15 being supplied by a pipe 18 which is connected into the tank 11 at a point 19 intermediate of the height of that tank. The emulsion is delivered through the pipe 17 into a vertical pipe 20 in which a pipe 21 is free to turn and slide, this pipe making a loose fit with the pipe 20. Suspended on a rod 22 is a movable electrode 23 which consists, in the form shown, of six hollow spokes 24 communicating at central end with pipe 20 and at circumferential end, each terminating in a reaction nozzle 25, these nozzles being directed tangentially to an anchor ring 26 to which they are secured.

The anchor ring 26 is concentric with the axis of the members 21 and 22. The member 22 extends through a stand pipe 30 and carries a brake wheel 31 and a rotation indicator 32. The brake wheel 31 is engaged by a brake 34 which is fastened at 35 to a bracket 36, the other end of the brake passing through a projection 37 on the member 36 and through a compression spring 38 which may be adjusted by a thumb nut 39. Suspended on three sets of insulators 40 by means of rods 41 is a live stationary electrode 42. This electrode is formed of wire mesh and is hung concentric with the center of the anchor ring 26. The insulators 40 are supported by rods 45 passing through stand pipes 46 in the top of the tank 12 and supported therein by set screws 47. A bushing 50 makes a tight closure with the top of the tank and a conductor 51 passing therethrough and being connected to a flexible wire or chain 53 which extends down and connects with one of the rods 41. A valve 60 is provided in the pipe 18 and a pipe 61 having a valve 62 is provided for withdrawing water from the bottom of the tank.

The method of operation is as follows:

The oil entering the pipes 14, 17, 20 and 21 is distributed through the hollow arms 24, passing through the nozzles 25 in a tangential direction. The reaction of the tangential nozzles 25 tends to rotate the ring 26 in a counter clockwise direction as shown by the arrow in Fig. 2. An electrical potential is impressed between the conductor 51 and the tank 11, this resulting in the establishment of an electric field between the anchor ring 26 and the screen member 42. Due to this field dehydration takes place, the fine water particles being agglomerated and tending to fall into the bottom of the tank from which they may be withdrawn as water or emulsion to the pipe 61.

For the purpose of thoroughly mixing the entering oil with coarse emulsion I provide the injecting nozzle 15. The degree of mixing may be controlled by the valve 60, coarse water particles being taken in through the pipe 19 and being mixed in the pipe 17, 21 and 23 with the untreated or coarse emulsion. It is possible by raising the rods 45 and 22 to raise and lower the electric field in the tank, the pipe 21 sliding freely in a vertical direction in the pipe 20.

I claim as my invention:

1. In a dehydrator, the combination of: a stationary live electrode; a movable grounded electrode; and means by which the flow of fluid through the dehydrator turns said grounded electrode.

2. In a dehydrator, the combination of: a stationary electrode; a movable electrode free to turn about an axis; a nozzle carried by said electrode and directed tangentially to a circle struck from said axis; and means for forcing fluid under pressure through said nozzle.

3. In a dehydrator, the combination of: a stationary electrode; a movable electrode free to turn about an axis; a nozzle carried by said electrode and directed tangentially to a circle struck from said axis; a friction brake for resisting rotation of said movable electrode; and means for forcing fluid under pressure through said nozzle.

4. In a dehydrator, the combination of: a tank; dehydrating electrodes in said tank forming an electric field in a body of emulsion carried in said tank; and means for adjusting the vertical position of said field in said tank.

5. In a dehydrator, the combination of: a tank, electrodes forming an electric field in said tank; means for withdrawing a portion of the partially treated material from an intermediate part of said tank; and means for mixing said partially treated material with untreated emulsion and forcing said mixture into said tank.

6. In a dehydrator, the combination of: a tank; electrodes forming an electric field in said tank; means for withdrawing a portion of the partially treated material from an intermediate part of said tank; and means for mixing said partially treated material with untreated emulsion and forcing said mixture into the bottom of said tank.

7. In a dehydrator, the combination of: an anchor ring electrode; and an electrode having an inner surface concentric with the center of said anchor ring.

8. In a dehydrator, the combination of: an anchor ring electrode; and a foraminous electrode having an inner surface concentric with the center of said anchor ring.

In testimony whereof, I have hereunto set my hand at Los Angeles, California, this 13th day of December, 1921.

WILLIAM O. EDDY.